United States Patent [19]

Neuman

[11] Patent Number: 4,710,533

[45] Date of Patent: Dec. 1, 1987

[54] MELT PROCESSABLE CPVC BLENDS

[75] Inventor: Richard C. Neuman, Vermilion, Ohio

[73] Assignee: The B. F. Goodrich Company, Akron, Ohio

[21] Appl. No.: 895,096

[22] Filed: Aug. 11, 1986

[51] Int. Cl.$^4$ .......................... C08K 5/09; C08L 27/04
[52] U.S. Cl. .................................. 524/394; 524/399; 524/414; 524/423; 525/238; 525/239
[58] Field of Search ............... 525/238, 239; 524/394, 524/399, 414, 423

[56] References Cited

U.S. PATENT DOCUMENTS 4,304,884 12/1981 Okamoto .............................. 525/238
4,501,849 2/1985 Bourland .............................. 525/239

*Primary Examiner*—Jacob Ziegler

*Attorney, Agent, or Firm*—James R. Lindsay; Daniel J. Hudak

[57] ABSTRACT

Chlorinated polyvinyl chloride (CPVC) polymer alloys generally contain relatively large amounts of a flow enhancing polymer such as alpha-methyl styrene and a compatibilizing agent such as styrene acrylonitrile copolymer. The alloys are made from blends having a significant increase in processing stability, often more than double than CPVC compounds. Conventional salts can be utilized to co-stabilize the blends. Other improved physical properties of the alloys include dramatically reduced melt viscosities and good flexual modulus when compared to CPVC. Good impact resistance can be developed by the incorporation of impact modifiers such as acrylonitrile-butadiene-styrene copolymers. The smoothness of milled sheets made from the CPVC alloys is also significantly improved.

8 Claims, No Drawings

MELT PROCESSABLE CPVC BLENDS

FIELD OF THE INVENTION

The present invention relates to blends of chlorinated polyvinyl chloride (CPVC) polymers having an effective amount of a compound which improves processing stability and reduces melt viscosity. A compatibilizing agent reduces the brittleness of the blend. More specifically, the CPVC blends contain large amounts of an alpha-methyl styrene polymer and lesser amounts of styrene acrylonitrile (SAN) copolymer.

BACKGROUND

Heretofore, chlorination of polyvinyl chloride resins has resulted in improved glass transition temperatures, reduced crystallinity, and enhanced combustion characteristics. However, the melt viscosity at processing temperatures was increased. Dynamic thermal stability, moreover, was generally undesirable for various processing areas such as calendering, sheet extrusion, and injection molding.

No prior art is known with regard to blends of CPVC which contain relatively high amounts, that is in excess of approximately 10 parts by weight per 100 parts by weight of the CPVC resin, of a processing stabilizing or a flow enhancing polymer such as alpha-methyl styrene. No literature, moreover, is known with regard to any unexpected improvements obtained by utilizing a flow enhancing polymer such as alpha-methyl styrene to yield improved processing stability, reduced melt viscosity, better sheet appearance and smoothness, and the like.

SUMMARY OF THE INVENTION

It is therefore an aspect of the present invention to provide a blend of CPVC, a flow enhancing polymer, and a compatibilizing agent.

It is another aspect of the present invention to provide a high flow CPVC blend, as above, wherein remarkable and unexpected improvements are obtained in dynamic thermal stability.

It is a further aspect of the present invention to provide a high flow CPVC blend, as above, which has reduced melt viscosity and generally increased processing rates.

It is a still further object of the present invention to provide a high flow CPVC blend, as above, stabilized by either conventional tin or low cost conventional lead salts as used in rigid PVC as well as CPVC compounds designed for melt-processing.

The above blends can contain impact modifiers, stabilizers, lubricants and pigments required to develop useful appearance, physical and processing properties.

In general, a melt processable CPVC blend comprises, 100 parts by weight of CPVC, said CPVC having a chlorine content of from about 60% to about 75% by weight; an effective amount of a flow enhancing polymer to impart improved melt processability to said CPVC, and an effective amount of a compatibilizing agent to improve compatibility of the blend.

DETAILED DESCRIPTION OF THE INVENTION

According to the concepts of the present invention, dramatic improvements in processing properties as well as in various physical properties are obtained by blending CPVC with a high amount of a flow enhancing polymer and a generally lesser amount of a compatibilizing agent.

Considering the CPVC of the present invention it generally contains from about 60% to about 75% by weight of bound chlorine, desirably from about 60% to about 70% chlorine by weight and preferrably from about 63% to about 68% chlorine by weight. CPVC is most conveniently prepared by the chlorination of polyvinyl chloride such as described in U.S. Pat. Nos. 2,996,489; 3,100,762; 3,334,077; 3,334,078; 3,506,637; 3,534,013; 3,591,571; 4,049,517; 4,350,798; 4,377,459; 4,412,898; and 4,459,387. As known to the art, when polyvinyl chloride is post-chlorinated, a number of events occur. For example, the glass transition temperature generally increases and crystallinity is reduced as the percentage of chlorine increases. However, as the chlorine content increases, the CPVC resin becomes more difficult to melt process and also becomes more brittle. Processability of CPVC resins has been a notable shortcoming thereof. It has been unexpectantly found that high or effective amounts of various compounds yield dramatically improved properties. For purposes of this Specification, such compounds are referred to as flow enhancing polymers since they reduce melt viscosity.

Improved processing stability can be measured in several ways. A particular convenient method is to measure the increased time required to cross-link the blend of the present invention as measured by a rise in mixing torque. Generally, blends of the present invention have an increase cross-linking time of from about 50% to about 300% and preferably from about 90% to about 250% when compared with a CPVC compound having the same amount of chlorination and approximately the same molecular weight. The increased cross-linking time is observed by utilizing a Brabender torque rheometer rotating at 35 RPM. The bowl is heated to 400° F. and a 65 gram charge of the plastic material is added thereto. The time to onset of increased torque after the material has been fused is then measured. Another improved processing property is reduced melt viscosity. A reduction in melt viscosity of at least 20%, generally from about 20% to about 65% and preferably from about 40% to about 50%, is desired.

The amounts of various flow enhancing polymers utilized are generally high, that is relatively high when based upon 100 parts by weight of the CPVC resin and generally exceed typical additive amounts. Such effective amounts dramatically reduce processing stability problems often observed with CPVC resins. Particularly suitable flow enhancing polymers or oligomers include those made from various hydrocarbons substituted styrene monomers having the following formula:

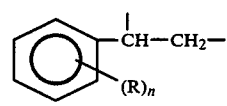

wherein R is generally an aliphatic group having from 1 to 5 carbon atoms. Desirably, it is an alkyl having from 1 to 4 carbon atoms and preferrably is methyl with alpha-methyl being highly preferred. The number of such substitutions, that is "n" is generally from 1 to about 3 with 1 being preferred. A highly preferred compound is thus alpha-methyl styrene. The molecular weight of the flow enhancing polymer made from monomers of the above formulation is from about 400 to about 2,000 and desirably from about 650 to about 1,000.

Regardless of the specific type of flow enhancing polymer, an effective amount utilized which imparts improved dynamic thermal process stability, based upon 100 parts by weight of the CPVC resin, is generally from about 10 or 12 to about 40 parts by weight, desirably from about 14 to about 30 parts by weight, and preferably from about 16 to about 26 parts by weight. High amounts are required since small amounts of the polymer generally do not significantly improve the flow and stability.

Flow enhancing polymers such as alpha-methyl styrene are generally incompatible with CPVC at the above noted levels and alloys thereof are very brittle regardless of the type or amount of impact modifiers utilized. Compatibility is improved by incorporating a compatibilizing agent. Generally, any such compound can be utilized in effective amounts which yield a suitable increase in compatibility. A practical indication of compatibility is the capability to develop useful impact resistance in the alloy. Impact resistance of the overall polymer alloy is also improved by using various impact modifiers, as discussed hereinbelow. Thus, Izod impact values (ASTM D256) of about 1.5 to about 10 ft.-lbs./in. of notch are indicative of useful compatibility of the polymer alloy. That is, both the compatibilizing agent as well as the impact modifiers contribute to the useful impact resistance of the alloy. An effective amount of the compatibilizing agent copolymer is generally from about 2 parts to about 10 parts by weight, and preferably from about 3 parts to about 6 parts by weight based upon 100 parts by weight of the CPVC resin. Preferred compatibilizing agents include the various styrene-acrylonitrile (SAN) copolymers or resins. SAN resins are random, amorphous copolymers of styrene and acrylonitrile produced by emulsion, suspension, or continuous mass polymerization as known to the art as well as to the literature. The amount of styrene therein as well as the molecular weight of the copolymer can be varied to achieve different properties of the overall CPVC alloy. Generally, higher molecular weight styrene-acrylonitrile copolymers are desired with regard to optimum properties. The molecular weight of the copolymer as indicated by melt flow (ASTM D1238-82 condition I) can vary from about 0.5 to about 50 grams/10 min. and preferably from about 2 to about 30. The amount of styrene within the copolymer can broadly vary from about 50% to about 90%, desirably from about 60% to about 80% and preferrably from about 68% to about 72% by weight.

The net result is a CPVC which has remarkable improvement in processing stability. The addition of compounds such as alpha-methyl styrene was expected to improve flow properties, that is reduce the melt viscosity. It was totally unexpected that improved processing stability properties would be obtained and especially those of the magnitude achieved as noted hereinabove. The results obtained by the present invention thus generally constitute a breakthrough with regard to the processing stability of CPVC. Another dramatically improved property is that of milled sheet smoothness. Conventional CPVC compounds stabilized with lead salts will produce a rough, nervy sheet when processed for 5 minutes on a 6"×12" two roll mill set at 370° F. (188° C.). Preferred embodiments of the present invention dramatically reduce or nearly eliminate roughness and nerve in sheets milled using tight (0.020" or 0.5 mm) roll clearance.

Inasmuch as high impact values are often desired, conventional impact modifiers can be added, as noted above, which are known to the art as well as to the literature. For example, various impact modifiers can be utilized as set forth in The Encyclopedia of PVC, Volume 2, Chapter 12, Marcel Dekker, Inc., New York, 1977, which is hereby fully incorporated by reference. Impact modifiers which can be utilized in the present invention generally have a Tg of 0° C. or less with a lower Tg being desired. Examples of various specific impact modifiers include various acrylonitrile-butadiene-styrene (ABS) polymers, the various chlorinated polyethylenes, the various acrylic rubbers, the various poly(ethylene-co-vinyl acetates), styrene-butadiene-styrene block copolymers, poly(methyacrylate-co-butadiene-co-styrene) (MBS), and the like. Impact modifiers of these types are commercially available. Preferred impact modifiers include ABS, MBS, and chlorinated polyethylene. Regardless of the exact type of impact modifier utilized, the amounts thereof can naturally vary, depending upon the desired impact strength as typically measured by an Izod notch impact test, (ASTM D256), from about 6 to about 20 parts by weight, and preferably from about 13 to about 17 parts by weight based upon 100 parts by weight of said CPVC resin. Accordingly, the blends of the present invention have the capacity to be impact-modified to achieve Izod (ASTM D256) values generally in excess of 1.5 ft lbs/in of notch, desirably in excess of 5.0 ft lbs/in and even in excess of 10 ft lbs/in.

Various salts can be utilized as stabilizers to impart improved thermal processing stability to the blends of the present invention. Generally, any conventional type of stabilizing salt or combinations thereof can be utilized as known to the art as well as to the literature. Generally, the stabilizing salts are HCl acceptors in that they tend to neutralize any HCl driven off of the CPVC during processing thereof. A general group of such salts are the various organic tin salts. Specifical examples thereof include dibutyl diisooctylthioglycolate, dimethyl diisooctylthioglycolate, and dioctyl diisooctylthioglycolate. A particularly useful salt type are the various organic lead salts. In addition to being inexpensive as compared to the tin salts, the lead salts have been found to yield higher flexual modulus, higher heat distortion temperatures, and higher Izod properties. Examples of some typical lead salts include tribasic lead sulfate, dibasic lead phosphite, dabasic lead stearate, dibasic lead phthalate and the like. The lead salts are generally utilized in combination. The total amount of the various salts, regardless of the type thereof, generally ranges from about 1 to about 10 parts by weight, desirably from about 2 to about 8 parts by weight, and preferably from about 3 to about 6 parts by weight per 100 parts by weight of said CPVC resin.

The overall heat resistance of the CPVC blends of the present invention containing salt stabilizers therein formed by melt processing the blends, as measured by heat distortion temperatures at 264 psi, is from about 170° F. to about 215° F. and preferably from about 175° F. to about 190° F. The Vicat "B" properties of the CPVC blends are generally from about 200° F. to about 300° F. and desirably from about 210° F. to about 270° F., and the flexual modulus of the blend is from about 350,000 psi to about 480,000 psi with from about 390,000 psi to about 450,000 being preferred.

The CPVC blends of the present invention can be made in any manner wherein the various components are added together and mixed under heat. For example, the appropriate amount of the CPVC resin can be added to a vessel. The various salt co-stabilizers such as the various lead salts can be added thereto and mixed at a slow speed for a relatively short period of time, that is a matter of few minutes, e.g. about 1 minute. The remaining ingredients such as the flow enhancing polymers, the compatibilizing agents, and the impact modifiers can be added thereto and mixed. Mixing can generally occur at temperatures of from about 300° F. to abut 400° F. Once a thermoplastic blend is formed, it can generally be processed in any conventional manner. For example, it can be calendered into an appropriate end product, sheet extruded, injection molded, or the like.

Common compounding aids can be utilized and added in conventional amounts such as conventional lubricants, for example ester waxes, oxidized polyethylenes, and the like. Various pigments can also be utilized to impart a desired color to the thermoplastic blend.

The CPVC blends of the present invention can be utilized wherever good dynamic thermal stability and relatively good flex modulus are desired. For example, specific uses include floppy disk jackets, cooling tower media, and the like.

The invention will be better understood by reference to the following examples:

The formulations set forth in TABLE I were prepared.

TABLE 1

| FORMULATIONS | A | B | CONTROL |
|---|---|---|---|
| CPVC 63.5% Cl (1) | 100.00 | — | 100.00 |
| CPVC 65.6% Cl (2) | — | 100.00 | — |
| p-Alpha Methyl Styrene (3) | 25.50 | 25.50 | — |
| p-Styrene-Acrylo-Nitrile (4) | 4.50 | — | — |
| p-Styrene-Acrylo-Nitrile (5) | — | 4.50 | — |
| p-Ethylene Vinyl Acetate (6) | — | — | 3.00 |
| ABS Toughener (7) | 17.00 | 13.00 | — |
| MBS Toughener (8) | — | — | 10.00 |
| Tribasic Lead Sulfate | 2.5 | 2.5 | 2.5 |
| Dibasic Lead Phosphate | 1.5 | 1.5 | 1.5 |
| Dibasic Lead Stearate | 0.5 | 0.5 | 0.5 |
| Polymeric Lubricant (9) | 1.25 | 1.25 | 2.0 |
| Oxidized PE Wax (10) | — | 0.50 | 0.25 |
| Ester Wax (11) | 1.25 | 1.25 | — |

| | Trade Name | Supplier |
|---|---|---|
| (1) | TempRite 666 × 512 | BFGoodrich |
| (2) | TempRite 647 × 532 | BFGoodrich |
| (3) | Resin 18-210 | Amoco |
| (4) | SAN 125 | Borg Warner |
| (5) | Tyril 880B | Dow Chemical |
| (6) | Elvaloy 837 | DuPont |
| (7) | Blendix 336 | Borg Warner |
| (8) | Paraloid KM 680 | Rohm & Haas |
| (9) | Paraloid K175 | Rohm & Haas |
| (10) | AC 629A | Allied Chem. |
| (11) | Loxiol G-70 | Henkel |

The CPVC was added to a Banbury along with the various lead salts and mixed at a processing temperature of approximately 370° F. for about 1 minute. The remaining ingredients were then added and mixed at the same temperature until fluxed. The various polymer blends produced were then milled, pressed and tested with regard to various processing properties and product properties and the results thereof are set forth in TABLE II.

TABLE II

| | PERFORMANCE | | |
|---|---|---|---|
| | A | B | Control |
| Processing Properties | | | |
| Milled Sheet (1) Appearance | Smooth, Glossy Sl. Nerve | Smooth, Glossy Sl. Nerve | Very Rough and Nervy |
| Thermal Stability (2) | 21.5 min. | 25.0 min. | 11.0 min. |
| Relative Stability (3) | 195 | 227 | 100 |
| Melt Viscosity (4) | 13.5 | 12.7 | 22.3 |
| Relative Fluidity (5) | 165 | 176 | 100 |
| Product Properties | | | |
| Flexural Strength (6) | 12,200 psi | 12,800 psi | 12,400 psi |
| Flexural Modulus (6) | 419,000 psi | 417,000 psi | 374,000 psi |
| Izod Impact (7) | 7.78 ft-lbs per inch | 1.79 ft-lbs per inch | 13.7 ft-lbs per inch |
| Heat Distortion Temperature (8) | 80° C. | 84° C. | 91.5° C. |
| Acid Resistance (9) | | | |
| Weight Change | −0.01% | −0.04% | — |
| Flexural Str. Change | +1.7% | +2.4% | — |
| Tensile Strength (10) | 6860 psi | 7280 psi | 6980 psi |

(1) 6 × 12" Mill set at 370° F. (188° C.) and .020" gap. Sample taken after 5 minutes after powder added to mill.
(2) Brabender #5 oil heated bowl at 400° F., 35 rpm, 65 g change.
(3) Stability compared to control set at 100.
(4) Monsanto Automatic Capillary Rheometer; .0635" × .625" die with 400° F. (206° C.) temperature. Results in psi-seconds at 100 sec$^{-1}$ shear rate.
(5) Relative flow compared to control set at 100.
(6) ASTM D-790 AT 73° F.
(7) ASTM D-256 AT 73° F.
(8) ASTM D-648 using ⅛" bars.
(9) ASTM D-1784 = immersion in 80% $H_2SO_4$ 60° C. for 30 days.
(10) ASTM D-638 at 73° F.

As apparent from TABLE II, the polymer blends of the present invention achieved notable and unexpected improved processing properties, especially thermal stability and relative stability. Dramatic improvements were also obtained in melt viscosity and relative fluidity. Yet, no significant product properties were sacrificed and in fact the flexural modulus was improved.

While in accordance with the Patent Statutes, a best mode and preferred embodiment have been set forth in detail, the scope of the invention is not to be limited thereto, but rather by the scope of the attached claims.

What is claimed is:

1. A melt processable chlorinated polyvinyl chloride blend comprising:

100 parts by weight of chlorinated polyvinyl chloride, said chlorinated polyvinyl chloride having a chlorine content of from about 60% to about 75% by weight;

an effective amount of a flow enhancing polymer to impart improved melt processability to said chlorinated polyvinyl chloride, said flow enhancing polymer being made from monomers having the formula

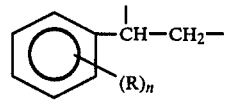

where R is an aliphatic having from 1 to 5 carbon atoms, wherein n is an integer of 1 to 3, wherein said effective amount of said flow enhancing polymer is from about 12 parts to about 40 parts by weight per 100 parts by weight of said chlorinated polyvinyl chloride, and an effective amount of a compatibilizing agent to improve compatibility of the blend so that said blend has an Izod impact value (ASTM D256) of at least 1.5 ft.lbs./in. of notch.

2. A melt processable chlorinated polyvinyl chloride blend according to claim 1, wherein said effective amount of said compatibilizing agent is from about 2.0 parts to about 10 parts by weight per 100 parts by weight of said chlorinated polyvinyl chloride.

3. A melt processable chlorinated polyvinyl chloride blend according to claim 2, wherein said compatibilizing agent is a styrene-acrylonitrile copolymer.

4. A melt processable chlorinated polyvinyl chloride blend according to claim 3, wherein the amount of chlorination of said chlorinated polyvinyl chloride is from about 60% to about 70% by weight.

5. A melt processable chlorinated polyvinyl chloride blend according to claim 4, wherein R of said flow enhancing monomer is an alykl having from 1 to 4 carbon atoms, wherein n is 1, wherein said styrene-acrylonitrile copolymer has a melt index from about 0.5 to about 50 grams/10 min., and wherein the amount of styrene in said styrene-acrylonitrile copolymer is from about 50% to about 90% by weight.

6. A melt processable chlorinated polyvinyl chloride blend according to claim 5, wherein R of said flow enhancing monomer is methyl and is located in a position alpha to said styrene group, wherein the molecular weight of said flow enhancing polymer is from 400 to about 2,000 and wherein the amount of said flow enhancing monomer is from about 14 parts to about 30 parts by weight per 100 parts by weight of said chlorinated polyvinyl chloride, wherein the amount of chlorination of said chlorinated polyvinyl chloride compound is from about 63% to about 68% by weight, wherein the melt index of said styrene-acrylonitrile copolymer is from about 2 to about 30 grams/10 min, wherein the amount of said styrene-acrylonitrile copolymer is from about 3 parts to about 6 parts by weight per 100 parts by weight of said chlorinated polyvinyl chloride.

7. A melt processable chlorinated polyvinyl chloride blend according to claim 2, including from about 1 to about 10 parts by weight of a lead salt stabilizer based upon 100 parts by weight of said chlorinated polyvinyl chloride compound.

8. A melt processable chlorinated polyvinyl chloride blend according to claim 6, including from about 2 to about 8 parts by weight of a lead salt stabilizer based upon 100 parts by weight of said chlorinated polyvinyl chloride compound.

* * * * *